Figure 3:
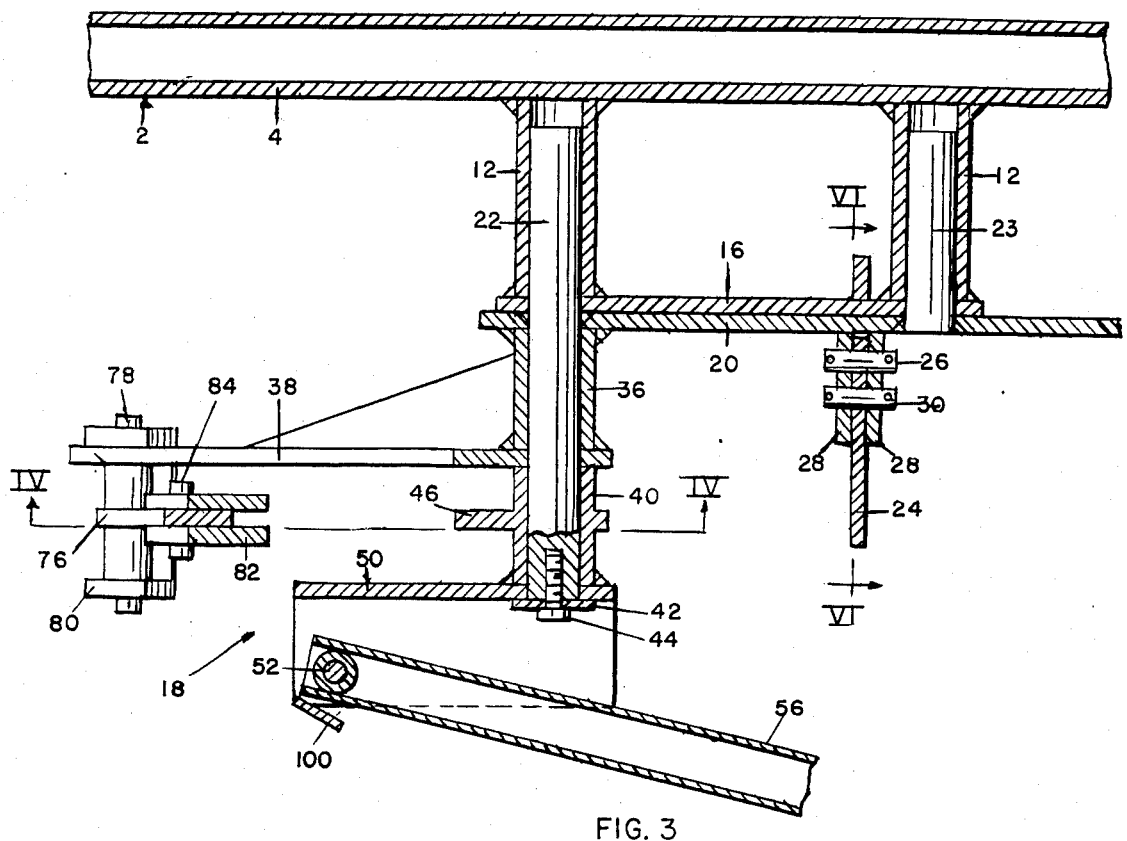

United States Patent [19]

Mullet et al.

[11] Patent Number: 4,691,784
[45] Date of Patent: Sep. 8, 1987

[54] LAWN EDGER ATTACHMENT FOR TRACTORS

[75] Inventors: David L. Mullet, Sarasota, Fla.; Ivan W. Bontrager, Hesston, Kans.

[73] Assignee: Excel Industries, Inc., Hesston, Kans.

[21] Appl. No.: 902,516

[22] Filed: Sep. 2, 1986

[51] Int. Cl.[4] ............................................. A01D 34/84
[52] U.S. Cl. ..................................... 172/15; 172/305; 56/256
[58] Field of Search .................. 172/14, 15, 16, 305, 172/297, 308, 303, 98, 99; 56/256

[56] References Cited

U.S. PATENT DOCUMENTS

| | | | |
|---|---|---|---|
| 2,437,581 | 3/1948 | Wray | 172/297 |
| 2,539,864 | 1/1951 | Rutherford | 172/305 |
| 2,601,380 | 6/1952 | Flory | 172/297 |
| 2,630,052 | 3/1953 | Jory | 172/15 |
| 2,660,104 | 11/1953 | Rutherford | 172/305 |
| 4,046,200 | 9/1977 | Mullet | 172/14 |
| 4,200,155 | 4/1980 | Mullet | 172/14 |

Primary Examiner—Richard J. Johnson
Attorney, Agent, or Firm—John A. Hamilton

[57] ABSTRACT

A lawn edger attachment for a tractor including a boom universally pivoted at its inner end to the tractor for both horizontal and vertical movement of its outer end, and normally angling acutely outwardly from the tractor, a circular cutting blade mounted beneath the outer end of the boom for rotation both about its own horizontal axis and about a vertical axis relative to the boom, a manually operable mechanism for pivoting the boom to position the blade above and in the plane of the division line between grassy and paved ground areas, and to lower it into ground engagement at the division line, the mechanism having a novel arrangement reducing the apparent weight of the boom and blade to the tractor operator, and a manual operating mechanism for pressing the blade into penetrating relation to the ground, the mechanism providing a great mechanical advantage in multiplying the manual force applicable by the operator of the tractor.

12 Claims, 8 Drawing Figures

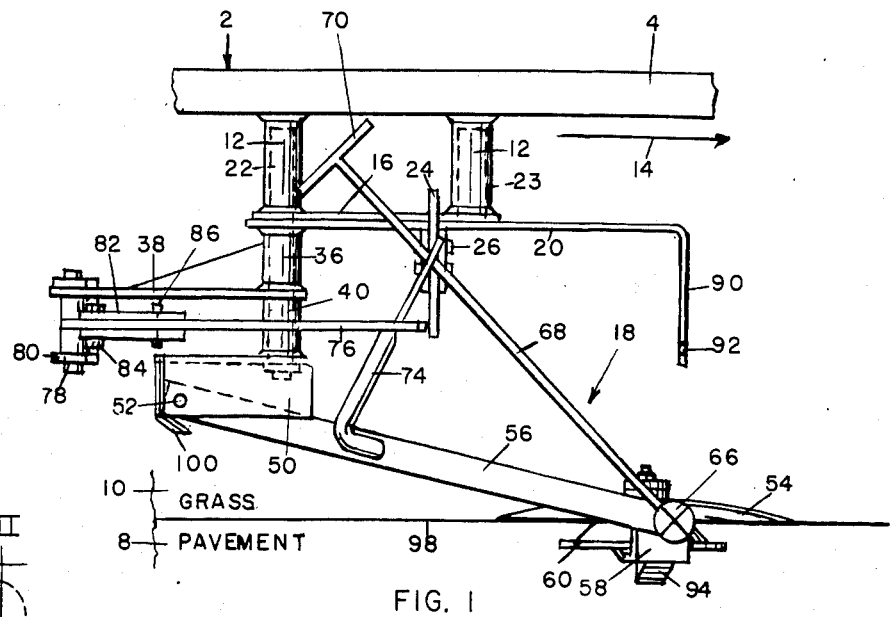
FIG. 1
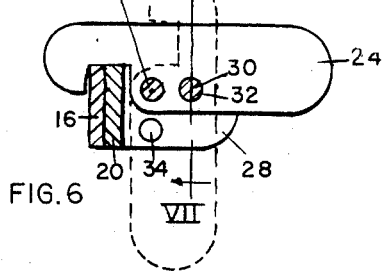
FIG. 6
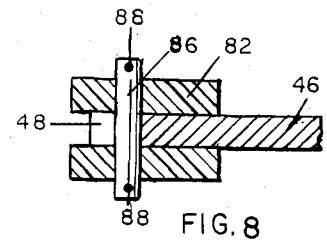
FIG. 8
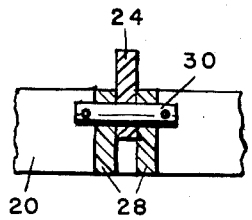
FIG 7
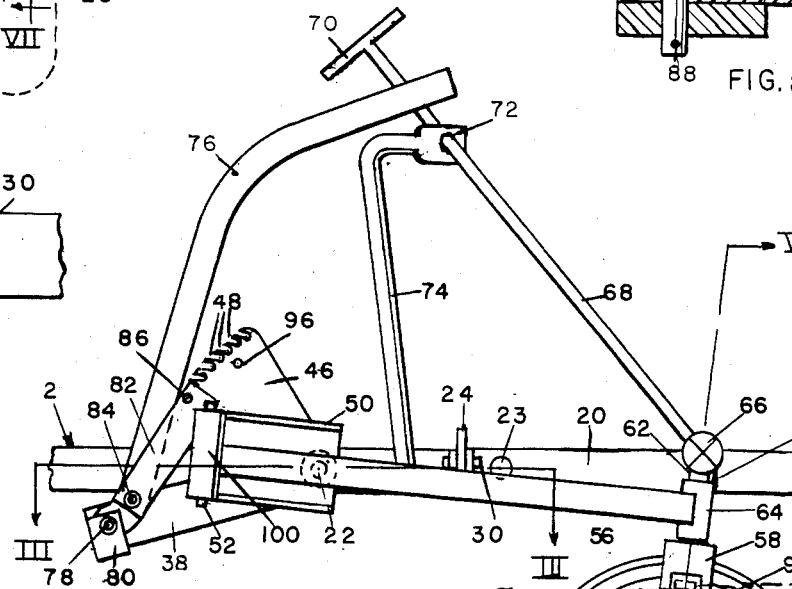
FIG. 2
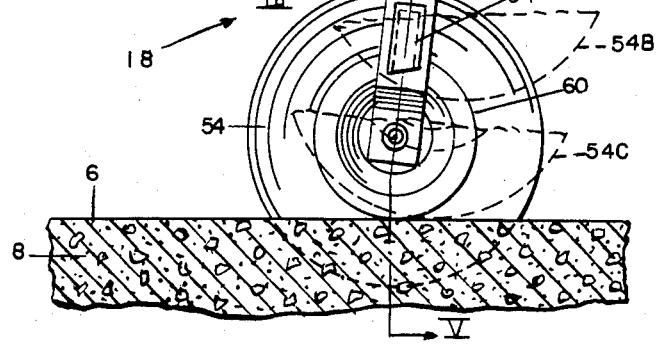

LAWN EDGER ATTACHMENT FOR TRACTORS

This invention relates to new and useful improvements in lawn edging devices, which are implements for severing grass, and soil as well, which tends to extend from lawns over the surfaces of sidewalks, driveways and other paved areas, in order to improve the appearance of the lawn and give it a more neatly tailored appearance. Such grass cannot be cut by ordinary lawn mowers, due to the tendency of such grass to lie flat on the pavement, but once it has been severed by an edger as described, it can be disposed of by sweeping or otherwise. The present edger is an improvement over that shown in prior application for U.S. Pat. No. 06/772,732, filed Sept. 5, 1985, now U.S. Pat. No. 4,629,006 and having common ownership with the present invention.

The prior application above referred to shows an edger including a boom of some length universally pivoted at its inner end to the frame of a tractor, and adapted to be swung outwardly at an acute angle to the line of travel of the tractor. A rolling coulter blade was mounted beneath its outer end so as to be rotatable about its own horizontal axis, and for rotation about a vertical axis relative to the boom. Manual means was provided for lifting and pivoting the boom, and for turning the blade on its vertical axis, to rest the blade on the ground at the division line between a grassy area and a paved area, with its vertical plane parallel to said division line. A foot pedal mechanism then pressed the blade downwardly with sufficient force that it penetrated into the ground to a desired depth, so that as the tractor was then driven forwardly, the blade would sever any grass or other vegetation, as well as soil itself, extending over the division line.

This structure was generally satisfactory in most respects. With the convex side of the coulter blade facing the grass side of the division line, earth pressure thereon forced the blade to ride against the edge of the pavement, and the horizontal free pivotability of the boom allowed the blade to follow the pavement edge accurately despite the fact that the tractor might not always be driven in a line accurately parallel to said edge, or at a constantly uniform lateral spacing from said edge. The vertical pivotability of the boom allowed the tractor to operate at either side of the division line, or when the tractor must operate on paved surfaces lower than the ground level by the elevation of a curbing or the like. However, it is also desired that the edger be operable independently of, and with no interconnection to, the power plant of the tractor, entirely by manual force, except of course for the forward draft supplied by the tractor, the manual operating force being supplied by the human operator of the tractor. Under these circumstances, it was found that physically less powerful persons, such as women, often did not have enough strength to operate the edger. The coulter blade and its mountings are rather heavy, and the boom is necessarily of substantial length to provide the desired degree of lateral movability relative to the tractor. The initial positioning of the boom and blade involves lifting, lowering and transverse movement of the boom, and the physical force for doing so must overcome the force moment of the weight of the blade and boom about the horizontal axis of the universal connection of the boom to the tractor. Therefore, one object of the present invention is the provision, in a structure of the character described, of means for reducing the physical force required to lift the boom and blade. This is accomplished by shifting the horizontal axis of the universally pivotal connection of the boom to the tractor to a point intermediate the vertical axis of the universal connection and the end of the boom carrying the coulter blade. This reduces the force moment of the blade and boom relative to the horizontal axis, and therefore reduces the force required to lift them, while at the same time not reducing the range of the horizontal movability of the blade relative to the tractor.

Another difficulty encountered with the prior structure was that the foot pedal mechanism for forcing the blade into penetrating relation with the ground required more strength and weight than is possessed by some tractor operators, and accordingly another object of the present invention is the provision of a mechanism, which while still manually operated, is capable of providing an almost unlimited mechanical advantage translating the pivotal motion of a manually operable lever to downward pressure on the blade.

Other objects are simplicity and economy of construction, efficiency and dependability of operation, and ease and convenience of mounting and demounting of the edger to and from the tractor.

Figure 4:
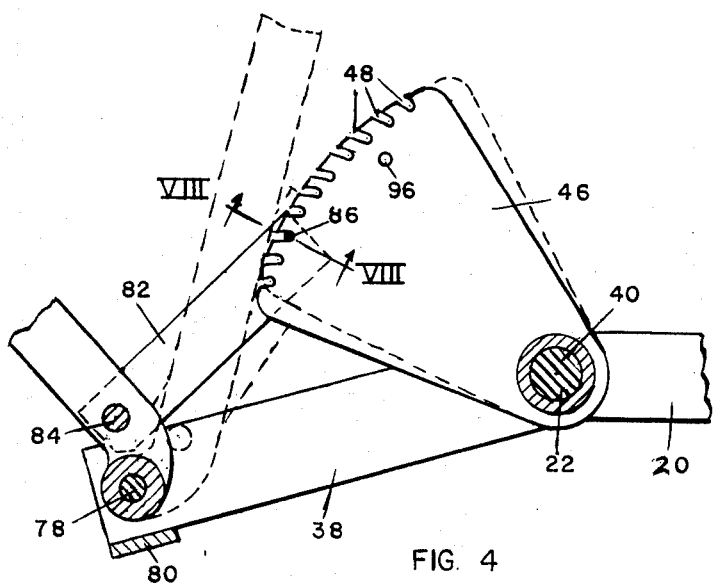
Figure 5:
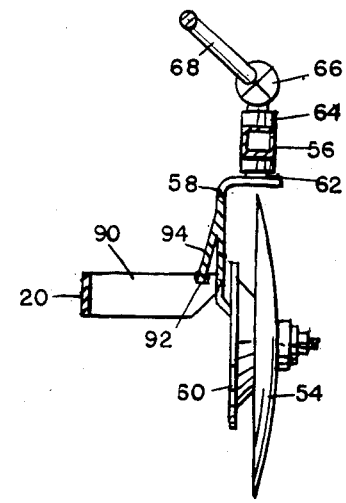

With these objects in view, as well as other objects which will appear in the course of the specification, reference will be had to the accompanying drawing, wherein:

FIG. 1 is a top plan view of a lawn edger attachment embodying the present invention, shown operatively mounted on a fragmentarily illustrated tractor, FIG. 2 is a side elevational view of the elements shown in FIG. 1, FIG. 3 is an enlarged, slightly irregular fragmentary sectional view taken on line III—III of FIG. 2, FIG. 4 is a fragmentary sectional view taken on line IV—IV of FIG. 3, illustrating operation of the ratchet lever for forcing the coulter blade into the ground, FIG. 5 is a sectional view taken on line V—V of FIG. 2, FIG. 6 is a sectional view taken on line VI—VI of FIG. 3, illustrating operation of the edger mounting latch, FIG. 7 is a sectional view taken on line VII—VII of FIG. 6, and FIG. 8 is an enlarged fragmentary sectional view taken on line VIII—VIII of FIG. 4.

Like reference numerals apply to similar parts throughout the several views, and the numeral 2 applies generally to a power driven tractor (usually but not necessarily of the small "lawn and garden" type) on which it may be desired to mount a lawn edger attachment. The only element of the tractor shown is a side bar 4 of its frame, which it will be understood is rigid relative to the tractor, and extends fore-and-aft at one side thereof (the right side as illustrated) in spaced relation above the ground level 6 indicated in FIG. 2, which is also the level of the top surface of a paved area 8 adjacent a grassed ground area 10, as shown in FIG. 1. The tractor normally moves forwardly in the direction of arrow 14 in FIG. 1.

As a mount for the lawn edger attachment, there are a pair of horizontal socket tubes 12, welded at their inner ends to side bar 4 in spaced apart relation to each other, and extending laterally outwardly from said side bar. Usually said socket tubes will be disposed between the front and rear wheels of the tractor. The outer ends of tubes 12 are rigidly connected to a bar 16 extending parallel to frame bar 4 in outwardly spaced relation therefrom, said tubes opening through bar 16. The lawn edger attachment forming the subject matter of the present invention is indicated generally by the numeral 18, and includes a base member 20 on which all other elements of the edger are carried, and constituting an elongated bar adapted to lie against the outer surface of bar 16. A pair of parallel rods 22 and 23 are rigidly affixed to base 20 and are slidably engaged in socket tubes 12 to mount the edger 18 on the tractor. When the rods 22 and 23 are fully inserted into sockets 12, bar 20 lies flush against bar 16, and a latch lever 24 pivoted at 26 to a pair of ears 28 fixed to base 20 (see FIGS. 3 and 6) may then be engaged over bar 16 to lock the base in assembly with sockets 12, as shown in solid lines in FIG. 6. Also, it may be pivoted to the position shown in dotted lines in FIG. 6, so that the base may be demounted from the tractor. A second pin 30 extends through lever 24 and ears 28, and is removable so as to be insertable selectively through either of two sets of matching holes 32 and 34 of the ears to lock the latch lever in either its locked or unlocked positions, as desired.

Rod 22, the rearward of the two as shown, is extended laterally outwardly from base 20, and has rigidly affixed thereto a sleeve 36 to which in turn is affixed a rearwardly and downwardly inclined are 38. Said arm is therefore rigidly associa-ed with the tractor frame. A second sleeve 40 is rotatably mounted on rod 22 outwardly from sleeve 36 and arm 38, and is retained on said rod by a washer 42 and a screw 44 threaded into the end of the bar (see FIG. 3). A ratchet sector 46 is affixed radially to sleeve 40 intermediate the ends of the latter, and extends generally upwardly and rearwardly therefrom, its extended end being concentric with rod 22 and having a series of notches 48 formed therein. Affixed to the outer end of sleeve 40 is a generally horizontal, outwardly opening crank 50 of channel form. Said crank member extends rearwardly from rod 22, and an elongated boom 56 is pivoted at its rearward end within channel 50, at the rearward end of the latter, on a generally vertical axis, as indicated at 52.

Said boom normally projects laterally outwardly from the side of the tractor, at an acute angle to the direction of travel of the tractor, as shown in FIG. 1. Disposed beneath the outer end of the boom is a circular rolling coulter blade 54. Said blade is concavo-convex in form, being mounted for axial rotation in a holder bracket 58, and having a gauge wheel 60 affixed concentrically thereto in outwardly spaced relation from its concave face. Bracket 58 is provided, above the blade and substantially in the plane thereof, with a generally vertical stub axle 62 which is journalled rotatably in a bearing 64 affixed to the outer end of the boom. Said axle extends above the bearing, and is connected through a universal joint indicated at 66 to the lower end of a control rod 68, which extends upwardly and laterally inwardly of the tractor to a position which it will be understood is conveniently accessible to the driver of the tractor. At its upper end said control rod is provided with a T-handle 70, and intermediate its ends it extends rotatably through an aperture 72 formed therefor in the upper end of a rigid arm 74 which is affixed at its lower end to boom 56 at a position fdrwardly of the rod 22 forming the horizontal pivotal axis of the boom.

A long manually operable lever 76 is pivoted at its lower end, as indicated at 78, to a bracket 80 affixed to the rearward end of arm 38, which is rigid relative to the tractor frame. Said lever extends upwardly to a position conveniently accessible to the operator of the tractor, and may be reciprocated forwardly and rearwardly. Slightly above the pivot 78 of lever 76, a double link 82 is pivoted to link 76 at 84. The two coextensive bars forming said link project upwardly and forwardly from pivot 84, and extend along the opposite lateral sides of ratchet sector 46, and a pin 86 extends laterally between and is secured in said link bars by removable cotter keys 88. said pin normally being engaged in one of the notches 48 of the sector. Finally, it will be seen that the forward end portion of base member 20, forwardly of the forward mounting rod 23, is bent horizontally outwardly generally in alignment with the forward position of the centerline of coulter blade 54 to form an arm 90 the outer end of which is formed to present an upwardly opening hook 92. As will appear, a keeper member 94 affixed to the carrier bracket 58 of the coulter blade may be engaged in said hook when the blade is elevated above ground level 6 and swung laterally inwardly relative to the tractor. This places the blade at the elevation indicated in dotted lines at 54B in FIG. 2, for safe and easy transport of the attachment. When the blade is just touching the ground, and has not been pressed into the ground 10, the blade will have the elevation shown in dotted lines at 54C in FIG. 2, while its normal position after penetration is shown in solid lines at 54.

In operation, it will be seen that when the edger attachment 18 mounted on the tractor by inserting rods 22 into sockets 12, and locked in assembly therewith by latch 24 as already described, the boom 56 may be pivoted upwardly and downwardly by rearward and forward movement of T-handle 70 by the operator of the tractor, and swung laterally toward and from the side of the tractor by lateral movement of said handle. Normally, when the edger attachment is not in actual use, the operator engages keeper member 94 of the blade bracket 58 in hook 92 of the edger base, as shown in FIG. 5. Also, when the edger is not in use, one of the cotter keys 88 securing pin 86 in ratchet link 82 is removed and the pin withdrawn, then reinserted so as to pass additionally through a hole 96 formed in sector 46 in spaced relation from its notched edge. This secures operating lever 76 against free and uncontrolled movement.

When the operator desires to place the edger attachment in use, he places pin 86 in its normal relation to the ratchet link 82, and engages said pin in one of the notches 48 of the sector 46. Then, by manipulation of handle 70, he first disengages keeper 94 from hook 92 of the edger base, swings the boom laterally outwardly until blade 54 is disposed directly above the division line 98 between the grass area 10 and a paved area 8 of a lawn, with the convex face of the blade facing the grassy side of the line and the concave face toward the pavement, and lowers the blade into ground engagement at said line. To cause penetration of the blade into the ground, the operator oscillates operating lever 76 forwardly and rearwardly. During each forward stroke of the lever, it cooperates with link 82 in the manner of a toggle linkage, causing pin 86 of the link to turn ratchet sector 46 and boom 56 in a clockwise direction about rod 22, as viewed in FIGS. 2 and 4, thus forcing the blade into the ground. On each rearward stroke of lever 76, pin 86 is cammed out of the sector notch 48 in which it is then engaged, and eventually falls by gravity into another of notches 48, spaced apart in a counterclockwise direction from the notch in which it was previously engaged, and the process may be repeated as many times as may be necessary to force the blade into the ground as far as may be desired, usually until gauge wheel 60 engages the pavement surface. As the lever 76 approaches the forward limit of its stroke, link pivot 84 passes through dead-center position as it passes through a plane including pin 86 and the axis of pivot 78, and the lever then engages and comes to rest against the notched edge of sector 46. The blade is thus locked in the position to which it has then been lowered, and cannot be elevated by any pivoting of the boom relative to its rod 22. The parts are of sufficient strength that excessive upward ground pressure on the blade can only lift the adjacent side of the tractor itself. The tractor is then driven forwardly in a line generally parallel to the division line 98 between the grass and pavement areas, and blade 54 rolls forwardly, its sharp edge severing any grass or soil extending across said line, so that it may be later conveniently disposed of by sweeping or otherwise. When the end of a run of the edging operation is reached, a slight rearward movement of handle 70 will break the dead-center lock of link 82, and the blade may then be lifted by further rearward movement of handle 70 to engage keeper 94 on hook 92.

It will be seen that if blade 54 is arranged so that its convex face projects toward the grass side of division line 98, as in FIG. 1, then the pressure of the soil on the convex face as the tractor is moved forwardly with the blade penetrated into the ground will force the blade against the edge of the pavement, and will retain it thereagainst even if the lateral spacing of the tractor from line 98 should vary due to inaccurate steering thereof. This compensation is provided by the free pivotability of boom 56 on its vertical axis 52. The blade 56 may be turned freely about the vertical axis provided by axle 62, simply by turning handle 70 to rotate control rod 68 about its axis. A 180 degree reversal of the blade from the position shown in FIG. 1, in which the tractor is running at the grass side of division line 98, permits the tractor to run at the pavement side of the line, while still maintaining the convex face of the blade toward the grass side. Any such reversal, and of course the initial alignment of the blade with division line 98, must be made with the blade out of contact with the ground. It will be noted that with the blade positioned as in FIG. 1, it must be reversed 180 degrees about its vertical axis before keeper 94 can be engaged on hook 92. An angled stop 100 forming a part of channel 50, which in turn forms a part of the universally pivotal connection of boom 56, prevents the boom from swinging outwardly to any excessive degree.

It is of importance that the vertical pivot 52 of boom 56 is spaced substantially rearwardly from its horizontal pivot 22. This substantially reduces the force moment of the weight of blade 54 and boom 56 about the horizontal axis, and therefore reduces the rearward force on handle 70 required to lift the boom and blade during normal use of the device. This permits manual raising, lowering and lateral adjustment of the blade by persons of less than ample physical strength, such as women or others. For good durability and ruggedness, the blade, boom and connected structure must necessarily be of substantial bulk and weight, and the boom must be of sufficient length to permit the desired span of lateral movement of the blade relative to the tractor. The offsetting of the horizontal and vertical axes by which the boom is universally mounted does not reduce the span of movement of the blade relative to the tractor.

It is also of importance to the present invention that the manually operable toggle linkage 76–82 provides a virtually unlimited mechanical advantage in multiplying manual force applied to lever 76 to downward force pressing blade 54 into the ground. This furthers the general object that the edger attachment not require electric, hydraulic or other power connections to the tractor itself, and that the ground penetration of the blade can be accomplished manually by persons of less than ample physical strength. Manual operating lever 76 may have a wide stroke of considerable angular extent, but with the proper proportioning of the elements, each forward stroke of said lever need advance ratchet sector 46 only by the very small angular interval between two successive notches 48 of the sector, thus providing a very large mechanical advantage. With the elements proportioned as shown, any reasonably active person, even a woman or child, may press the blade downwardly with sufficient force to elevate the wheels at the adjacent side of the tractor free of the ground, if the blade is positioned over concrete or other impenetrable material. Other proportions could produce still greater mechanical advantages, if desired. The mechanism also provides a convenient means for locking the blade at any desired degree of penetration into the ground, by means of the over-dead-center arrangement of the lever and links shown in FIG. 2 and in dotted lines in FIG. 4, and as previously described.

While we have shown and described a specific embodiment of our invention, it will be readily apparent that many minor changes of structure and operation could be made without departing from the spirit of the invention.

What we claim as new, and desire to protect by Letters Patent, is:

1. A lawn edger attachment for a tractor comprising:
   a. a base member,
   b. means for attaching said base member rigidly but removably to the frame of said tractor,
   c. an elongated boom normally extending laterally outwardly from said tractor at an acute angle to the direction of travel of the tractor,
   d. a universally pivotal connection joining the inner end of said boom to said base member,
   e. a circular, generally planar cutting blade disposed beneath the extended end of said boom in a generally vertical plane, being mounted on said boom both for rotation about its own axis and for rotation about a generally vertical axis relative to said boom,
   f. a manual operating lever connected to said boom and extending to a position accessible to the operator of the tractor, said lever being operable by forward and rearward movement thereof to pivot said boom on the horizontal axis of said universal pivotal connection, and by lateral movement thereof to pivot said boom on the vertical axis of said universal connection, said horizontal and vertical axes of said universal connection being offset relatively to each other in a direction longitudinal to said boom, whereby said boom may be pivoted about said horizontal axis to lift said boom and said blade with less manual force applied to said operating lever than would be required if said horizontal and vertical axes were both disposed at the same longitudinal point of said boom, g. manually operable means for turning said blade on its vertical axis relative to said boom, and h. manually operable means for pivoting said boom on the horizontal axis of said universal connection to press said blade into penetrating relation to the ground.

2. A lawn edger attachment as recited in claim 1 wherein said universal boom connection comprises:

a. a crank pivoted at one end to said base member on a horizontal transverse axis, and extending radially from said axis, said boom lying generally in a plane containing both said crank and the horizontal pivotal axis thereof, and b. a generally vertical pivot normal to said plane connecting the inner end of said boom to the outer end of said crank, the extended horizontal axis of said crank intersecting said boom intermediate the ends thereof.

3. A lawn edger attachment as recited in claim 1 wherein said blade is of concavo-convex circular dish form, the convex face thereof facing the grass side of a division line between grassed and paved ground areas when the blade is disposed parallel to said division line and pressed into the ground at said line, whereby soil pressure on said convex face will pivot said boom horizontally to maintain the blade against the pavement edge as the tractor moves generally parallel to said division line, and will also pivot said blade on its vertical axis relative to the boom to maintain the plane of the blade parallel to the division line.

4. A lawn edger as recited in claim 3 wherein said manual operating lever is also operable to turn said blade on its vertical axis relative to the boom, whereby the convex face of the blade may be turned to face the grass side of said division line regardless of the side of said division line at which the tractor may be running.

5. A lawn edger attachment as recited in claim 4 wherein said manually operable lever for positioning said boom and blade is compound, consisting of:

a. a control rod universally pivoted at one end to said blade through the vertical pivotal connection thereof to the outer end of said boom, whereby axial rotation of said control rod will turn said blade on its vertical axis, said control rod extending to a position conveniently accessible to the operator of the tractor, and being provided with a hand grip at its opposite end, and b. a rigid lever affixed at one end to an intermediate point of said boom and extending therefrom to intersect said control rod intermediate the ends of the latter, said control rod being axially rotatable relative to said rigid lever at its point of intersection therewith.

6. A lawn edger attachment as recited in claim 1 wherein said manually operable means for pivoting said boom to press said blade into penetrating relation to the ground comprises:

a. a repetitively operable ratchet mechanism interconnecting said base member with said boom and operable each time it is operated to pivot said boom downwardly to press said blade into the ground by an incremental amount, and b. manually operable means for actuating said ratchet mechanism repetitively.

7. A lawn edger attachment as recited in claim 6 wherein said manually operable means for operating said ratchet mechanism includes a toggle linkage including a pair of links pivoted together at their proximate ends and respectively to said base and said ratchet at their distal ends, and manually operable means for pivoting said links alternately between a relatively angled relation and a linearly aligned relation, whereby said linkage is extended to move said ratchet to press said blade into the ground.

8. A lawn edger attachment as recited in claim 7 with the addition of a stop member operable to arrest the movement of said toggle links immediately after their connecting pivot passes through a dead-center position relative to the end pivots of said links, whereby said blade is locked at the degree of ground penetration it has then attained.

9. A lawn edger attachment as recited in claim 7 with the addition of a manual operating lever formed by an extension of one of said toggle links and extending to a position conveniently accessible to the operator of the tractor, the length of said lever being so great, as compared to the degree of ground penetration obtained by each operation of said ratchet mechanism, that the manual force applied to said lever applies a greatly multiplied downward force to said blade.

10. A lawn edger attachment as recited in claim 1 wherein said manually operable means for pivoting said boom to press said blade into penetrating relation to the ground comprises:

a. a mounting member pivotal with said boom as said boom pivots vertically, but not as it pivots horizontally, b. a circular sector forming a crank affixed at one end to said mounting member and extending radially to the horizontal axis of said boom, the outer end thereof concentric with said axis having a series of angularly spaced apart notches formed therein, c. a pair of toggle links pivoted together at their proximate ends, the distal end of one of said links being pivoted to said base on an axis parallel to said horizontal boom axis, d. a transverse pin fixed in the distal end of the other of said links and pivotally engaged in one of the notches of said ratchet sector, and e. a lever formed by an extension of one of said toggle links and extending to a position conveniently accessible to the operator of the tractor, whereby movement of said lever in one direction straightens said toggle links to an extended position to pivot said boom vertically to press said blade into the ground, and movement of said lever in the opposite direction buckles said toggle links to an angled relation to withdraw said pin from the notch of the ratchet sector it then occupies and allows it to enter a following sector notch.

11. A lawn edger attachment as recited in claim 10 wherein the pin carried by one of the toggle links rests on the notched edge of said ratchet sector by gravity, and said ratchet notches are inclined toward the pivot of the proximate ends of said links, whereby movement of said lever in said one direction causes said pin to enter a notch by gravity, and movement of said lever in said opposite direction cams said pin outwardly from said notch to ride freely along the notched edge of the sector.

12. A lawn edger attachment as recited in claim 10 with the addition of a stop member positioned to arrest movement of said toggle links immediately after said links pass a dead-center position in which their proximate pivot passes through a plane containing their end pivots, whereby said blade is locked at whatever degree of ground penetration it has then achieved.

* * * * *